US009722945B2

United States Patent
Siciliano et al.

(10) Patent No.: US 9,722,945 B2
(45) Date of Patent: Aug. 1, 2017

(54) DYNAMICALLY IDENTIFYING TARGET CAPACITY WHEN SCALING CLOUD RESOURCES

(71) Applicant: Microsoft Technology Licensing, LLC, Redmond, WA (US)

(72) Inventors: Stephen Siciliano, Bellevue, WA (US); Charles Lamanna, Bellevue, WA (US); Ilya Grebnov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 14/307,745

(22) Filed: Jun. 18, 2014

(65) Prior Publication Data
US 2015/0281113 A1 Oct. 1, 2015

Related U.S. Application Data (60) Provisional application No. 61/972,706, filed on Mar. 31, 2014.

(51) Int. Cl.
*G06F 9/50* (2006.01)
*H04L 12/24* (2006.01)
(Continued)

(52) U.S. Cl.
CPC .............. *H04L 47/70* (2013.01); *G06F 9/505* (2013.01); *G06F 9/5072* (2013.01);
(Continued)

(58) Field of Classification Search
CPC ...... H04L 41/04–41/14; H04L 43/0817; H04L 47/70; H04L 47/781
See application file for complete search history.

(56) References Cited

U.S. PATENT DOCUMENTS 7,743,001 B1   6/2010  Vermeulen et al.
8,028,051 B2   9/2011  Hasegawa
(Continued)

FOREIGN PATENT DOCUMENTS

EP      2381363 A2      10/2011
EP      2624138          8/2013
WO   WO 2014047073      3/2014

OTHER PUBLICATIONS

"International Preliminary Report on Patentability Issued in PCT Application No. PCT/US2015/022604", Mailed Date: Feb. 11, 2016, 7 Pages.
(Continued)

*Primary Examiner* — Patrice Winder
(74) *Attorney, Agent, or Firm* — Workman Nydegger (57) ABSTRACT

Embodiments are directed to preventing flapping when auto-scaling cloud resources. In one scenario, a computer system accesses information specifying a target operational metric that is to be maintained on a plurality of cloud resources. The computer system determines a current measured value for the target operational metric for at least some of the cloud resources. The computer system further calculates a scaling factor based on the target operational metric and the current measured value, where the scaling factor represents an amount of variance between the target operational metric and the current measured value. The computer system also calculates a delta value representing a modified quantity of cloud resources modified by the calculated scaling factor and determines whether a scaling action is to occur based on the calculated delta value.

20 Claims, 6 Drawing Sheets

(51) Int. Cl.
*H04L 12/26* (2006.01)
*H04L 12/911* (2013.01)

(52) U.S. Cl.
CPC ........ *G06F 9/5083* (2013.01); *H04L 41/0836* (2013.01); *H04L 43/0817* (2013.01); *H04L 47/781* (2013.01)

(56) References Cited

U.S. PATENT DOCUMENTS

| | | | | |
|---|---|---|---|---|
| 8,286,165 | B2 * | 10/2012 | Miyata | G06F 1/32 709/221 |
| 8,296,434 | B1 | 10/2012 | Miller et al. | |
| 8,380,880 | B2 | 2/2013 | Gulley et al. | |
| 8,499,066 | B1 | 7/2013 | Zhang et al. | |
| 8,572,612 | B2 | 10/2013 | Kern | |
| 8,589,549 | B1 | 11/2013 | Vermeulen et al. | |
| 8,606,897 | B2 | 12/2013 | Ferris et al. | |
| 8,661,182 | B2 * | 2/2014 | Behera | G06F 9/455 711/6 |
| 8,756,610 | B2 | 6/2014 | Dasgupta et al. | |
| 8,806,501 | B2 | 8/2014 | Fong et al. | |
| 9,075,656 | B2 * | 7/2015 | Ota | G06F 9/5022 |
| 9,081,622 | B2 * | 7/2015 | Padala | G06F 9/5072 |
| 9,110,728 | B2 * | 8/2015 | Shen | G06F 9/455 |
| 9,207,984 | B2 | 12/2015 | Sivasubramanian et al. | |
| 9,251,115 | B2 * | 2/2016 | Bursell | G06F 15/177 |
| 9,292,354 | B2 * | 3/2016 | Michael | G06N 5/04 |
| 9,306,870 | B1 | 4/2016 | Klein et al. | |
| 9,363,154 | B2 * | 6/2016 | Akolkar | G06F 9/5005 |
| 2005/0044228 | A1 | 2/2005 | Birkestrand et al. | |
| 2005/0086029 | A1 | 4/2005 | Cascaval et al. | |
| 2008/0172671 | A1 | 7/2008 | Bouillet | |
| 2010/0332643 | A1 | 12/2010 | Benari | |
| 2011/0078303 | A1 | 3/2011 | Li et al. | |
| 2012/0173709 | A1 | 7/2012 | Li et al. | |
| 2012/0204186 | A1 | 8/2012 | Davidson et al. | |
| 2012/0254443 | A1 | 10/2012 | Ueda | |
| 2012/0260019 | A1 | 10/2012 | Malaiyandisamy et al. | |
| 2012/0324092 | A1 | 12/2012 | Brown et al. | |
| 2013/0007753 | A1 | 1/2013 | Jain | |
| 2013/0086273 | A1 | 4/2013 | Wray et al. | |
| 2013/0318527 | A1 | 11/2013 | Tamura | |
| 2013/0346614 | A1 | 12/2013 | Baughman et al. | |
| 2014/0040885 | A1 | 2/2014 | Donahue | |
| 2014/0082165 | A1 | 3/2014 | Marr et al. | |
| 2014/0082612 | A1 * | 3/2014 | Breitgand | G06F 9/45533 718/1 |
| 2014/0366020 | A1 * | 12/2014 | Lee | G06F 9/45533 718/1 |
| 2015/0113120 | A1 | 4/2015 | Jacobson et al. | |
| 2015/0278061 | A1 | 10/2015 | Siciliano et al. | |

OTHER PUBLICATIONS

U.S. Appl. No. 61/972,703, filed Mar. 31, 2014, Siciliano et al.

Yuan, et al., "Scryer: Netflix's Predictive Auto Scaling Engine—Part 2", Published on: Dec. 4, 2013. Available at <<http://techblog.netflix.com/2013/12/scryer-netflixs-predictive-auto-scaling.html>>.

Gandhi, et al., "AutoScale: Dynamic, Robust Capacity Management for Multi-Tier Data Centers", In Journal of ACM Transactions on Computer Systems, vol. 30, Issue 4, Apr. 2012, 31 pages.

Ramesh, et al., "Project Hoover: Auto-Scaling Streaming Map-Reduce Applications", In Proceedings of the Workshop on Management of Big Data Systems, Sep. 21, 2012, 7 pages.

"International Search Report and Written Opinion Issued in PCT Application No. PCT/US2015/022605", Mailed Date: Jun. 22, 2015, 11 pages.

"Second Written Opinion Issued in PCT Application No. PCT/US2015/022605", Mailed Date: Apr. 28, 2016, 6 Pages.

"International Preliminary Report on Patentability Issued in PCT Application No. PCT/US2015/022605", Mailed Date: Jul. 19, 2016, 7 Pages.

"International Search Report and Written Opinion Issued in PCT Application No. PCT/US2015/022604", Mailed Date: Jun. 18, 2015, 12 Pages.

Mao, et al., "Cloud Auto-scaling with Deadline and Budget Constraints", In 11th IEEE/ACM International Conference on Grid Computing (GRID), Oct. 25, 2010, 8 pages.

Keagle, Charles., "AWS Auto-Scaling", Retrieved on: Mar. 21, 2014 Available at: http://2ndwatch.com/aws-auto-scaling/.

"How to Scale Web Sites", Published on: Jan. 22, 2014 Available at: http://www.windowsazure.com/en-us/documentation/articles/web-sites-scale/.

Office Action dated Apr. 11, 2017 cited in U.S. Appl. No. 14/307,759.

* cited by examiner

DYNAMICALLY IDENTIFYING TARGET CAPACITY WHEN SCALING CLOUD RESOURCES

CROSS-REFERENCE TO RELATED APPLICATIONS

This application claims priority to and the benefit of U.S. Provisional Application Ser. No. 61/972,706, entitled "Dynamically Identifying Target Capacity when Scaling Cloud Resources", filed on Mar. 31, 2014, which application is incorporated by reference herein in its entirety.

BACKGROUND

Cloud services are widely used to provide many types of functionality including hosting applications, providing access to data storage, providing web sites, email or other functionality. Cloud services typically run on a network of computer systems that may be located remotely to each other. The computer network may be configured to provide the various services using virtual machines. The services may be scaled by adding or removing virtual machines as needed. For instance, at times of peak load, additional virtual machines may be instantiated, while at times of reduced load, virtual machines may be shut down. In some cases, virtual machines may be shut down only to be immediately brought back up again due to an increase in load. This scenario is often referred to as "flapping".

BRIEF SUMMARY

Embodiments described herein are directed to preventing flapping when auto-scaling cloud resources. In one embodiment, a computer system accesses information specifying a target operational metric that is to be maintained on a plurality of cloud resources. The computer system determines a current measured value for the target operational metric for at least some of the cloud resources. The computer system further calculates a scaling factor based on the target operational metric and the current measured value, where the scaling factor represents an amount of variance between the target operational metric and the current measured value. The computer system also calculates a delta value representing a modified quantity of cloud resources modified by the calculated scaling factor and determines whether a scaling action is to occur based on the calculated delta value.

In another embodiment, an alternative method for preventing flapping when auto-scaling cloud resources is presented. In this embodiment, a computer system accesses auto-scaling rules that govern how a specified set of cloud resources is to be scaled. The computer system then identifies, according to the auto-scaling rules, a first candidate auto-scaling action, and further calculates a projected amount of resource consumption for the specified set of cloud resources, where the projected amount indicates the amount of resource consumption that would occur if the first candidate auto-scaling rule were to be applied. Then, upon determining that the projected resource consumption would not trigger a second auto-scaling rule, the computer system performs the first candidate auto-scaling action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to preventing flapping when auto-scaling cloud resources. In one embodiment, a computer system accesses information specifying a target operational metric that is to be maintained on a plurality of cloud resources. The computer system determines a current measured value for the target operational metric for at least some of the cloud resources. The computer system further calculates a scaling factor based on the target operational metric and the current measured value, where the scaling factor represents an amount of variance between the target operational metric and the current measured value. The computer system also calculates a delta value representing a modified quantity of cloud resources modified by the calculated scaling factor and determines whether a scaling action is to occur based on the calculated delta value.

In another embodiment, an alternative method for preventing flapping when auto-scaling cloud resources is presented. In this embodiment, a computer system accesses auto-scaling rules that govern how a specified set of cloud resources is to be scaled. The computer system then identifies, according to the auto-scaling rules, a first candidate auto-scaling action, and further calculates a projected amount of resource consumption for the specified set of cloud resources, where the projected amount indicates the amount of resource consumption that would occur if the first candidate auto-scaling rule were to be applied. Then, upon determining that the projected resource consumption would not trigger a second auto-scaling rule, the computer system performs the first candidate auto-scaling action.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
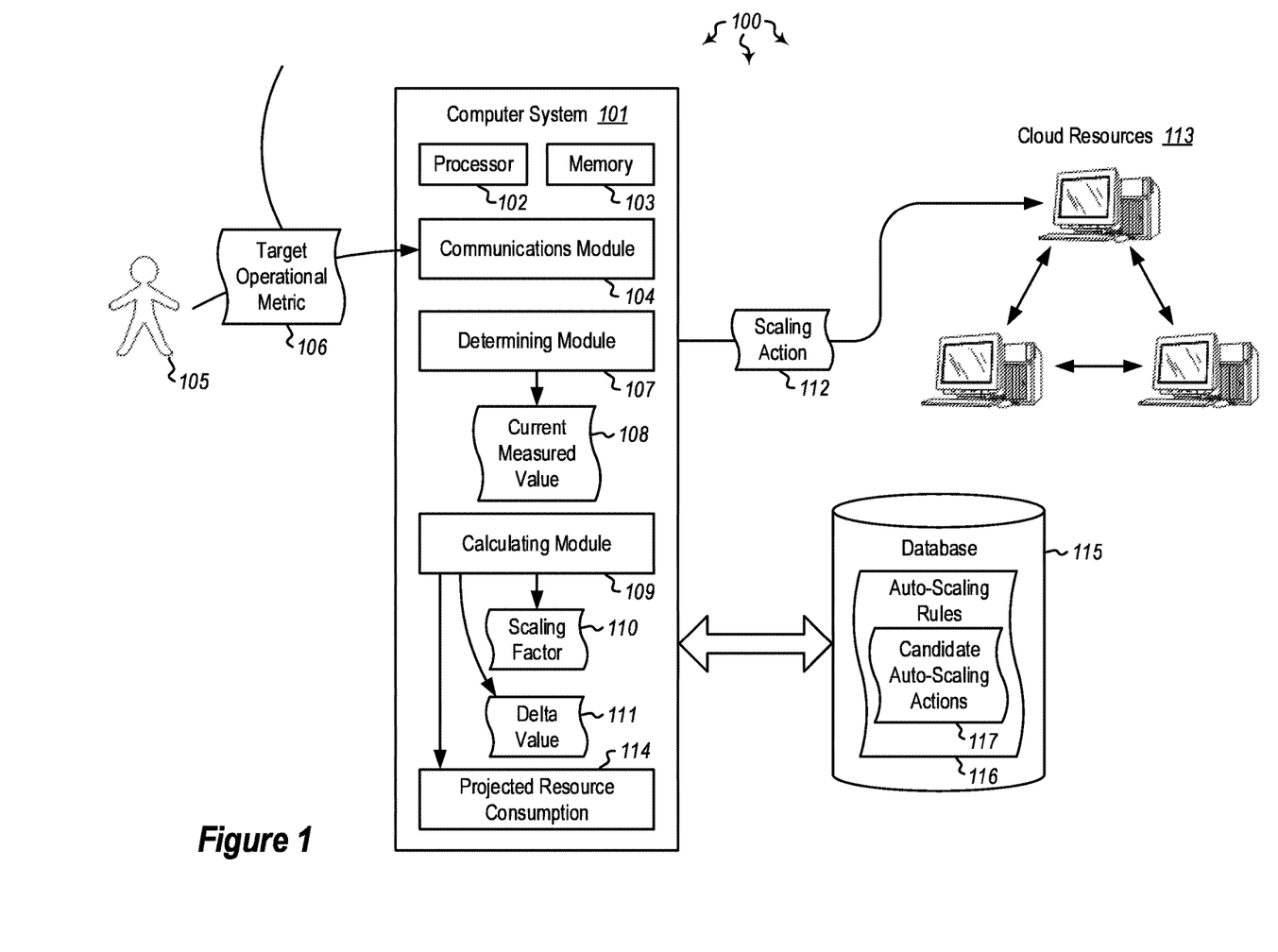
FIG. 1 illustrates a computer architecture in which embodiments described herein may operate including preventing flapping when auto-scaling cloud resources.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The computing module 104 may include any wired or wireless communication means that can receive and/or transmit data to or from other computing systems. The communications module 104 may be configured to interact with databases, mobile computing devices (such as mobile phones or tablets), embedded or other types of computing systems.

In some embodiments, the communications module 104 of computer system 101 may be configured to receive a target operational metric 106 from user 105. The target operational metric 106 refers to one or more operational metrics for a cloud resource, the target being a level, value or number that is to be met for that cloud resource. A cloud resource (e.g. 113) may be substantially any computing or networking resource including processors, processing cores, processing threads, processing units (such as operations per second) or similar, memory, hard drive or other storage space, networking bandwidth, networking ports, virtual machines, physical machines or any combination of the above. In one example, a user may specify that a processor or group of processors is to be maintained at 50% capacity. In some cases, 50% capacity may be optimal for processor usage, as the processor may still encounter a large load and have room to increase processing. In other cases, 40%, 60% or some other percentage may be optimal. In some cases, a user may specify an amount of memory (e.g. 8 Gb of memory or 1.5 Gbps network bandwidth or a minimum of three concurrently running virtual machines, etc.). Each of these would be examples of a target operational metric. As will be apparent, other examples are possible, and the above are only some instances of a target operational metric.

Once the computer system 101 has a target operational metric 106, the determining module 107 can determine whether the cloud resources 113 are to be scaled up or down. If the cloud resources are currently higher than needed, the cloud resources may be scaled down. For example, if the target operational metric 106 specified that a minimum of three virtual machines were to be concurrently running, and six virtual machines were currently running, up to three of those virtual machines could be shut down as long as the specified target operational metric 106 is still met. In other cases, if the cloud resources 113 are currently lower than needed to maintain the target operational metric 106, the resources may be scaled up. A "scaling action" or "autoscaling action", as the terms are used herein, refers to automatically scaling a cloud resource (e.g. the number of virtual machines (VMs) currently running to host a service, or the size of a particular VM hosting a service) up or down based on current need.

As indicated previously, if resources are repeatedly scaled up or down, the system is said to be flapping. Accordingly, changes in scale for a given resource are to be metered and carefully determined before being applied. The calculating module 109 may determine, from a current measured value 108 indicating a current measured value for that cloud resource 113, that a scaling action 112 is to occur. The scaling action may include scaling that cloud resource up or down a certain amount. The amount of the scaling action may depend on current and past conditions. The calculating module 109 may determine a scaling factor 110 and a delta value 111 in order to determine whether a scaling action is to be applied and, if so, the amount of scaling that is to occur. This will be explained further below with regard to FIGS. 1 and 4-6.

Embodiments described herein may be configured to calculate the number of cloud resources 113 (e.g. virtual machine instances) to add or remove based on the current total capacity of a given service, and the delta between the current operational metrics and the target operational metrics 106. In some scenarios this calculation includes three steps: 1) The user 105 provides the system with performance metrics that correlate to load. In some cases, these metrics can be normalized by the total number of instances resulting in a Per-Capita Load (PCL). 2) The user can further provide a per-capita target threshold for the amount of load they want each instance to handle of the given performance metric, referred to as the Per-Capita Target Threshold (PCTT). 3) A scale action 112 is then taken, and the size of that scale is determined by the delta 111 between the current per-capita value of the metric, and the user-defined threshold (i.e. the PCTT). In each scale action, the system also: a) projects the impact the scale action will have on the total capacity of the service (e.g. 114), and b) if the prediction indicates (under current load) that the new total capacity of the service cannot handle the load, then it can also reduce the magnitude of the scale action until the new capacity will be able to serve the current load.

In some cases, the user may not want or know how to define a Per-Capita Target Threshold. Instead, the user may define scale rules that instruct the system to scale up or down by a fixed amount. In that case, steps (1) and (3) would still be used, but (2) would be calculated. The scaling system may be configured to run on a regular basis (e.g. every 5 minutes) and may take two (or more) inputs each time it runs. The first input may be the number of virtual machine instances providing capacity to a specified service, and the second input may specify a set of current performance metrics that quantify the amount of work (a.k.a. load) the service is handling at that point in time. It should be noted that, at least in some embodiments, the scaling system may be configured to run on the same regular basis regardless of which inputs the user provides.

Figure 5:
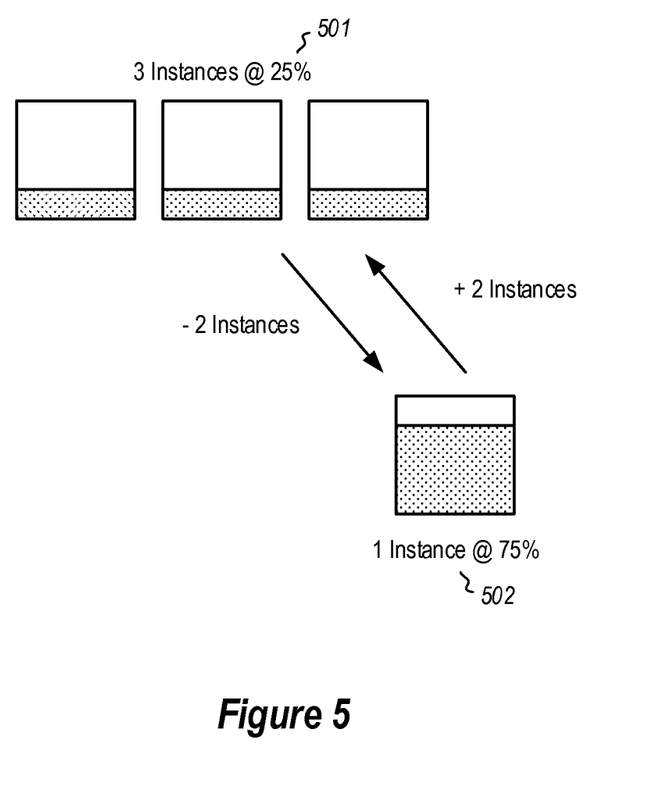
FIG. 5 illustrates an embodiment in which flapping occurs.

A flapping scenario is shown in FIG. 5. In FIG. 5, a user may have established three instances with 25% CPU utilization (501). The user's scale-down rule may indicate that two instances are to be removed. However, when two instances are removed, there is only one instance remaining, which will increase to 75% CPU utilization (502). This, in turn triggers the scale-up rule, adding two instances. Now, the user again will have three instances at 25% utilization. Another scale-down action is triggered, returning to one instance. This cycle will continue indefinitely, until the load changes.

Figure 4:
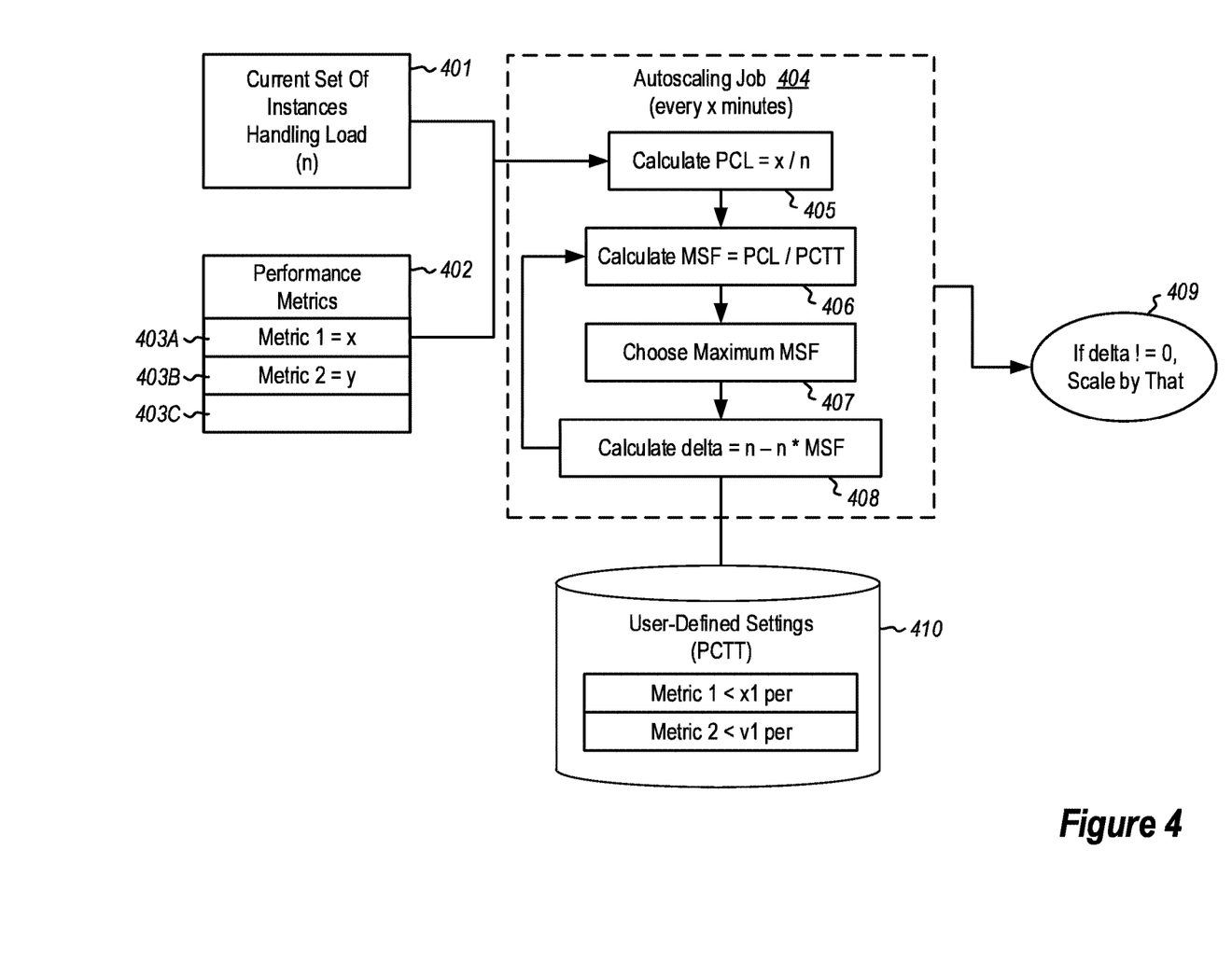
FIG. 4 illustrates an embodiment in which flapping is prevented using a calculated scaling factor and a delta value.

Flapping may be prevented using the Per-Capita Target Threshold (PCTT) 410 as shown in FIG. 4. For each run, the system first determines the Per-Capita Load (PCL) 405 for an auto-scaling job 404. The PCL may be calculated by: 1) evaluating each current performance metric 402 (including metrics 403A, 403B and 403C) showing the current operational status of the resource, and 2) for each current performance metric, divide into the total number of instances (n) 401 that are handling capacity 405. As a result, the PCL represents the per-unit load that each instance is under.

Next, a Metric Scale Factor (MSF) is calculated 406. At least in some embodiments, the MSF is the PCL divided by the user-defined PCTT. The MSF represents how far away from the target capacity (e.g. 106) the current capacity of the service is. At least in some embodiments, in order to prioritize resource performance, the maximum of all MSF's is used 407 (although this need not be the case—other scale factors less than the maximum MSF may be used). Using the maximum MSF ensures that resources will not be scaled down if there is any (substantial) chance that the scale-down will impact performance. Then, the number of instances is calculated that would be required to scale to that metric scale factor (i.e. the delta value at 408). If the delta value is not equal to zero (i.e. it is a positive or negative value) 409, a scale action will be performed according to the delta value. Thus, in one example that includes actual numbers, if x is set to 75% current CPU load, and n is equal to three virtual machine (or other resource) instances, then the PCL would be 75/3 or 25% per virtual machine. The MSF would be 25/50 or ½, and the delta could be 3−(3*½) or 1.5. Thus, in this example, 1.5 virtual machines is the delta or the number of excess machines that could be scaled down. If the number had been a negative number, it would indicate the number of resources that would need to be added to meet the operational performance metric.

In another embodiment, flapping may be prevented without using a PCTT value. In this scenario, the user may define a set of rules that specify how they want their service to scale (a.k.a. scale settings). For example, they could say "scale down by two instances when CPU load is less than 40%" and "scale up by two instances when CPU load is above 60%". In order to prevent the flapping scenario from happening, the computing system 101 predicts the impact that any given scale action will have on the service. At least in some cases, this may be done by assuming a linear regression: the assumption is that two machines at 50% load is equivalent to one machine at 100% or 4 machines at 25%. This process will now be described with reference to FIG. 6.

Figure 6:
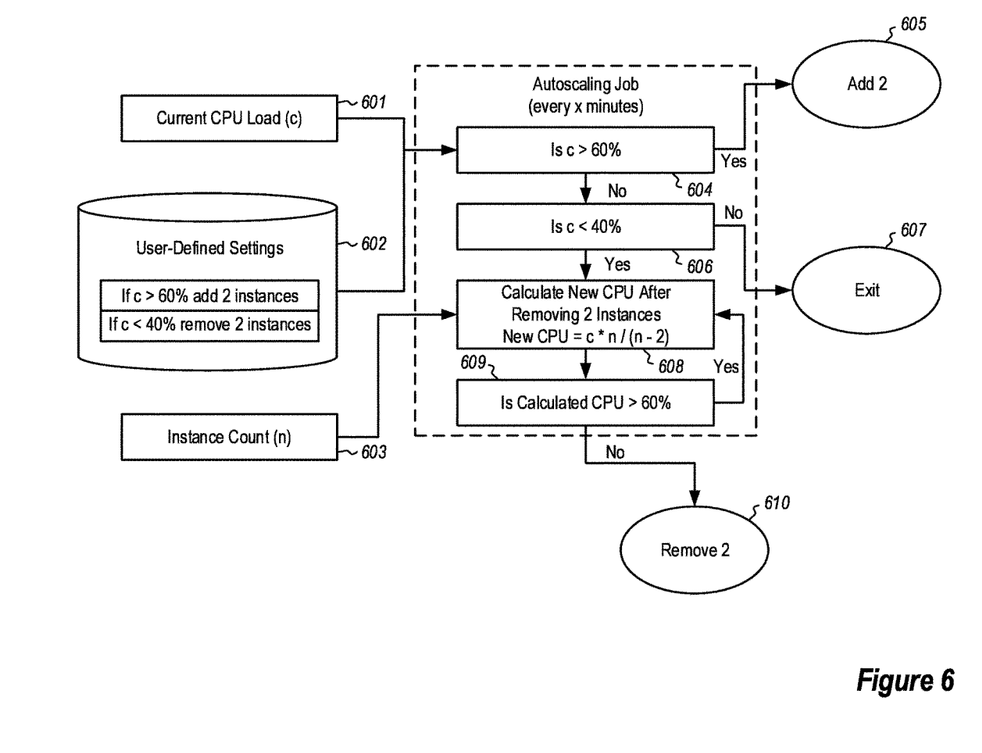
FIG. 6 illustrates an embodiment in which a projected resource consumption is calculated to prevent flapping in scenarios where auto-scaling rules are used.

For each execution of the auto-scaling engine: 1) Evaluate scale-up settings 602. In some embodiments, flapping may only be prevented on the scale-down side of the cycle. This prioritizes performance for a system over potential cost savings. If the scale-up rules indicate that an action is necessary, the job performs that action and exits. 2) Evaluate scale-down settings. If no scale down settings are triggered, then the system is in a good state and no further scaling is needed. 3) If scale-down indicated that a scaling rule was triggered, project the new CPU load 601 (or other resource measurement). This is calculated by this formula:

$$\text{proj. cpu} = \frac{\text{cur. cpu} \times \text{instance count}}{\text{instance count} - \text{scale down amount}}$$

4) Evaluate the scale-up settings, but with new projected CPU percentage. If it is determined that the scale up settings would not be triggered, then it is determined to be safe to scale down—no flapping will occur. 5) However, if the scale-up settings would be triggered, then decrease the scale down amount is decreased and the new CPU is projected again. In this manner, step 5 allows the system to scale down by the largest possible number that will not trigger flapping. It represents a close approximation of the user's intent (a scale action is still taken), but avoids the unnecessary cycle of flapping. In some scenarios this may mean that no scaling will happen at all, but this may be optimal as the system may otherwise be under-provisioned.

Accordingly, in providing an example with actual numbers where the cloud resource is CPU load, the system may look at current CPU load 601, user-defined settings (e.g. target operational metric 106), and a current virtual machine instance count 603. If the current CPU load is greater than 60% (604), the system may be configured to add two VMs (605). If the current CPU load is less than 40% (606), a new CPU load may be calculated (608) after removing two VM instances. If the current CPU load is not less than 40% (606), no action may occur and the system may exit (607). If the calculated CPU load after removing two instances is greater than 60% (609), it is determined that flapping will occur, and 608 is re-performed with one fewer instance removed. If the calculated CPU load after removing two instances is less than 60% (609), it is determined to be safe to scale down and two VM instances are removed (610). It will be understood that the numbers used in the above example are only one example among many possible examples, and that CPU load and virtual machines are some of many different examples of cloud resources that could be used. Further embodiments that may be used to reduce flapping are described below with regard to methods 200 and 300 of FIGS. 2 and 3, respectively.

Figure 2:
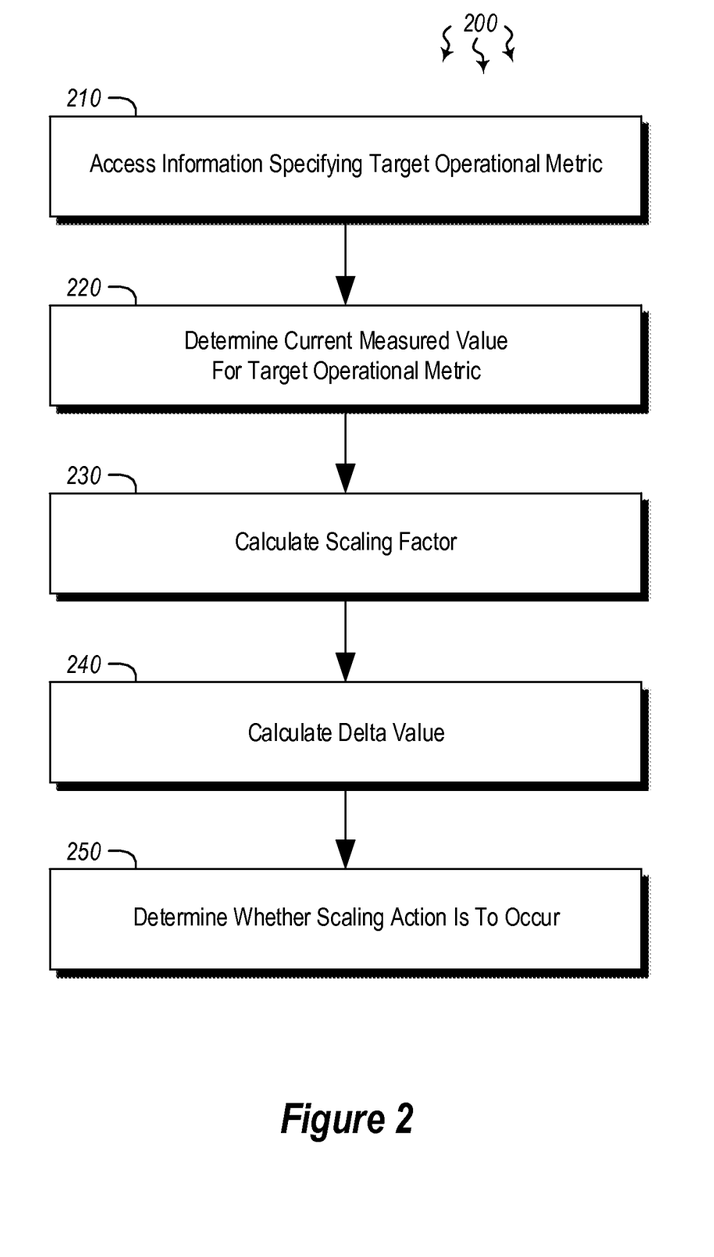
FIG. 2 illustrates a flowchart of an example method for preventing flapping when auto-scaling cloud resources.
Figure 3:
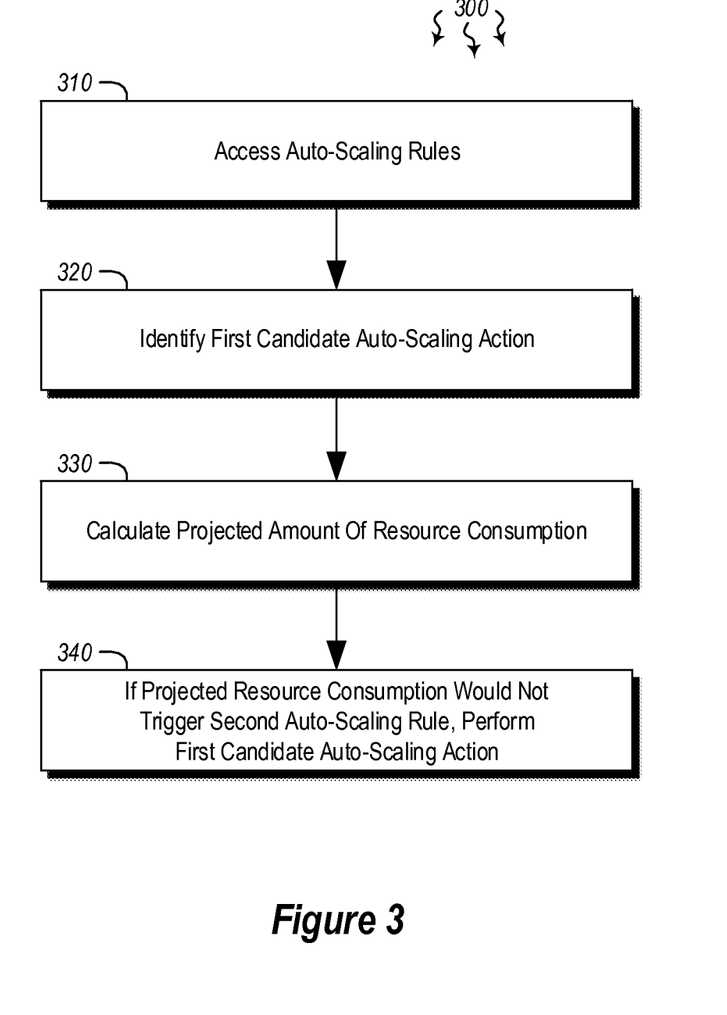
FIG. 3 illustrates a flowchart of an alternative example method for preventing flapping when auto-scaling cloud resources.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for preventing flapping when auto-scaling cloud resources. The method 200 will now be described with frequent reference to the components and data of environment 100.

Method 200 includes an act of accessing information specifying at least one target operational metric that is to be maintained on a plurality of cloud resources (act 210). For example, computer system 101 may access information that specifies at least one operational metric 106 that is to be maintained for one or more cloud resources 113. The target operational metric 106 may be provided by user 105 or by some other entity. Alternatively, the target operational metric 106 may be stored on a database (e.g. 115) or on some other data store. The target operational metric 106 may include upper and lower boundaries for a number of virtual machines or other cloud resources. In some cases, for example, the target operational metric 106 may specify that a group of virtual machines or that a given service is to average 50% CPU load. Other target operational metrics 106 may be tied to the health or performance of a service or specified cloud resource (e.g. maintaining a certain amount of memory, or maintaining the ability to handle a specified number of requests per second).

Method 200 next includes an act of determining a current measured value for the at least one target operational metric for at least some of the plurality of cloud resources (act 220). The determining module 107 of the computer system 101 may determine a current measured value 108 for the target operational metric 106 for one or more of the cloud resources 113. The calculating module 109 of the computer system 101 may then calculate a scaling factor 110 based on the at least one target operational metric 106 and the current measured value 108, where the scaling factor represents an amount of variance between the at least one target operational metric and the current measured value (act 230). The calculating module 109 may further calculate a delta value 111 representing a modified quantity of cloud resources 113 modified by the calculated scaling factor (act 240). The determining module 107 may then determine whether a scaling action 112 is to occur based on the calculated delta value (act 250).

In some embodiments, the scaling action 112 may include adding virtual machines or removing virtual machines. In other cases, the scaling action 112 may include increasing or decreasing the size of the virtual machines. Accordingly, a scaling action may increase or decrease the physical or virtual number of resources, or may increase or decrease the physical or virtual size of the resources. Thus, in the case of virtual machines, one or more of the virtual machines may be expanded in processing capacity, in memory, in hard drive space, in networking functionality, or in some other manner. For example, the virtual machine may be given access to more or fewer physical processing cores, or more or fewer network cards. In cases where multiple target operational metrics are specified, some of the target operational metrics may be prioritized higher than other target operational metrics. For instance, CPU load may be prioritized over networking capacity or hard drive space. Other prioritization scenarios are, of course, possible where other target operational metrics are given priority.

In some cases, virtual machine health may be prioritized over cost savings. For example, when virtual machine health is prioritized, each VM instance may be run at a lower CPU load. This may increase the cost to run the system, as more physical processors are running to process and run the VMs. This, however, may be what a client wants in order to ensure that they have sufficient ability to handle increases in load, or that sufficient processors are running that CPU load can fail over to another processor if one processor becomes faulty or otherwise experiences an error that prevents it from operating. Other prioritizations may also be possible. For instance, some workplaces may be able to drop to zero instances overnight, or on the weekends. In such cases, performance may be prioritized over health to provide quality service during the day and little to no service at night. Accordingly, embodiments described herein may prioritize different cloud resources 113, or may specify different general priorities that translate to policies that are applied to the various cloud resources.

As mentioned above, the calculating module 109 may calculate a scaling factor when determining whether to perform a scaling action 112 and, if a scaling action is to occur, how much the cloud resource should be scaled up or down. The scaling factor 110 represents a measure of how far away from the target capacity the current capacity of a given service is. The scaling factor 110 may be calculated for each of the target operational metrics 106. If user 105 or another user has specified a given prioritization that is to be applied, one or more specific scaling factors may be selected based on the prioritization. In some cases, the user may prioritize health over performance. In such cases, the specified scaling factor would include the maximum scaling factor 110. The maximum scaling factor represents the highest amount of variance between the target operational metrics and the current measured value for each target operational metric. Using this value will ensure that the resulting delta value 111 only has a value above one or below negative one (indicating that at least one cloud resource is to be added or removed) if the minimum level of health will be maintained without that cloud resource.

Users may select or provide service level agreements (SLAs) that are to be maintained during the hosting of a service. If such an SLA has been implemented for a service, the determining module 107 may identify at least one operational metric that, if implemented, would cause at least one SLA to no longer be enforceable. If such an operational metric is identified that would cause the SLA to no longer be enforceable, the computer system 101 may generate a notification notifying the user 105 that the selected operational metric 106 would result in the SLA no longer being enforceable. Thus, for example, if a user chose to have only one VM instance for a service, a notification would be sent to the user indicating that an SLA for that service cannot be provided when using only one VM instance. The user may thus be continually apprised when/if changes to target operational metrics break an existing SLA for a service.

Custom metrics may also be used. For instance, a user may create a customized target operational metric 106. The user may specify, for example, a number of shoppers that can be concurrently shopping on a website hosted by a set of VMs, or may specify some other metric that applies to their individual scenario. When custom target operational metrics are used, the user may further specify what a high or low value is per VM for the number of shoppers (the user may supply or access historical data to determine what these values would be). The user may also combine custom or built-in metrics to create a customized combination of target operational metrics 106 that are to be maintained for a group of cloud resources 113. Regardless of which target operational metrics are used, if the determining module 107 determines that a scaling action 112 is to occur, that scaling action is carried out on the cloud resources 113, such that cloud resources are added or removed according to the scaling action. The scaling action itself is based on the calculated delta value 111. In some cases, the calculating module 109 of computer system 101 may be configured to calculate a projected impact that the scaling action would have on the total capacity of the one or more virtual machines. This projected impact will be discussed further below with regard to method 300 of FIG. 3.

FIG. 3 illustrates a flowchart of a method 300 for preventing flapping when auto-scaling cloud resources. The method 300 will now be described with frequent reference to the components and data of environment 100.

Method 300 includes an act of accessing one or more auto-scaling rules that govern how a specified set of cloud resources is to be scaled (act 310). For example, computer system 101 may access auto-scaling rules 116 that govern how one or more of the cloud resources 113 are to be scaled. The auto-scaling rules may indicate, for example, that a cloud resource is to be automatically scaled up or down by a certain number of instances (e.g. by one or two or three, etc.). The rules may be based on a policy or may be specified directly for a given service. The auto-scaling rules 116 may include candidate auto-scaling actions 117. The computing system 101 may identify, according to at least one of the auto-scaling rules, a first candidate auto-scaling action (act 320). The first candidate auto-scaling action may be any one of the candidate auto-scaling actions 117. The auto-scaling rules are "candidate" rules as they are rules that may be applied or may not be applied, but are at least eligible to be applied.

Method 300 further includes an act of calculating a projected amount of resource consumption for the specified set of cloud resources, where the projected amount indicates the amount of resource consumption that would occur if the first candidate auto-scaling rule were applied (act 330). Accordingly, the calculating module 109 of computer system 101 may calculate a projected amount of resource consumption 114 for the cloud resources 113. The projected amount 114 includes the amount of resource consumption that would occur if the first candidate auto-scaling action 117 were to be applied. The computer system 101 may then determine that the projected resource consumption 114 would not trigger another auto-scaling rule, and proceed with performing the first candidate auto-scaling action (act 340). In this manner, the computer system 101 may look at a given auto-scaling action, determine that performing the auto-scaling action would trigger other auto-scaling actions (i.e. flapping) by projecting resource consumption for that auto-scaling action, and perform that action if it would not cause flapping. If the application of that auto-scaling action would cause flapping, it would be prevented.

In some embodiments, the first auto-scaling action may include removing a virtual machine from the specified set of cloud resources 113, and the second auto-scaling action may include adding a virtual machine to the specified set of cloud resources. Thus, in such embodiments, the projected resource consumption 114 would be projected as if the first auto-scaling action (removing a VM) were to be applied. If removing a VM would not trigger another auto-scaling action (adding a VM), then the first action may be applied.

In some cases, the auto-scaling rules 116 are implemented to prioritize scale-up rules over scale-down rules. This prioritizes health of the system or service over cost savings (e.g. the cost of running multiple CPUs at a lower load).

Still further, in some embodiments, the first auto-scaling action may be performed, but at a reduced amount. For instance, if the first auto-scaling action specified that three VMs were to be removed, only one VM may be removed instead of three. The reduced amount may be determined based on the calculated projected amount of resource consumption 114 that would occur if the first auto-scaling rule were fully applied. Performing the first auto-scaling action at a reduced amount may thus include performing the first auto-scaling using fewer virtual machine, or using scaled-down virtual machines that are smaller in size. In this manner, rule-based scaling systems may be used, but still may avoid flapping by projecting resource consumption for applying a given rule and, if that rule would trigger flapping, avoid applying the rule. Conversely, if the auto-scaling rule would not trigger additional auto-scaling rules, the auto-scaling rule may be applied and flapping will not occur. Accordingly, methods, systems and computer program products are provided which prevent flapping when auto-scaling cloud resources.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for auto-scaling cloud resources in order to increase or decrease the number of virtual machine (VM) instances used to meet a current computing load being handled by a service, the computer-implemented method being performed by one or more processors executing computer executable instructions for the computer-implemented method, and the computer-implemented the method comprising acts of:

periodically accessing information at given intervals, wherein the accessed information comprises:
a determination of how many VM instances (n) are currently being used to meet a computing load of a service; and
measured performance metrics that quantify the computing load the service is currently handling;

for at least one given measured performance metric, obtaining a per-capita load (PCL) by dividing the given measured performance metric by the number of VM instances being used to meet the computing load of the service;

accessing a user-defined per-capita target threshold (PCTT) representing an amount of the computing load each VM instance is to handle for the given performance metric;

determining a scaling action to be taken, but without flapping the VM instances by causing them to enter an undesirable cycle of alternately removing and then adding the same number of VM instances until the current computing load changes, by performing the following:
calculating a scaling factor based on dividing the PCL by the PCTT for the given performance metric, wherein the scaling factor represents an amount of variance between the at least one given measured performance metric and the user-defined per-capita target threshold (PCTT) representing an amount of the computing load each VM instance is to handle for the given performance metric;

calculating the number of VM instances required to scale to the scaling factor by determining a delta value based on the difference between i) the number of VM instances (n) currently being used to meet the computing load of the service and ii) n times the scaling factor;

determining whether a scaling action is to occur based on the calculated delta value; and when determined, performing the scaling action as indicated by the calculated delta value.

2. The computer-implemented method of claim 1, wherein the scaling action comprises adding virtual machines when the delta value is positive or removing virtual machines when the delta value is negative.

3. The computer-implemented method of claim 1, wherein the scaling action comprises increasing or decreasing the size of at least one virtual machine.

4. The computer-implemented method of claim 1, wherein a at least one of the performance metrics is prioritized higher than at least one other performance metric.

5. The computer-implemented method of claim 4, wherein health of the virtual machines is prioritized over cost savings.

6. The computer-implemented method of claim 4, wherein the scaling factor is calculated for each of the measured performance metrics and wherein a specified scaling factor is selected based on the prioritization.

7. The computer-implemented method of claim 6, wherein the specified scaling factor comprises a maximum scaling factor that represents the highest amount of variance between the at least one given measured performance metric and the user-defined per-capita target threshold (PCTT).

8. The computer-implemented method of claim 1, further comprising:
determining that at least one performance metric, if implemented, would cause at least one service level agreement (SLA) to no longer be enforceable; and
generating a notification that the selected operational metric would result in the SLA no longer being enforceable.

9. The computer-implemented method of claim 1, wherein upon determining that a scaling action is to occur based on the calculated delta value, the computer-implemented method further comprises calculating a projected impact the scaling action would have on the total capacity of the VM instances currently being used to meet the computing load of the service.

10. A computer-implemented method for auto-scaling cloud resources in order to increase or decrease the number of virtual machine (VM) instances used to meet a current computing load being handled by a service, the computer-implemented method being performed by one or more processors executing computer executable instructions for the computer-implemented method, and the computer-implemented the method comprising acts of:
periodically accessing information at given intervals, wherein the accessed information comprises:
a determination of how many VM instances (n) are currently being used to meet a computing load of a service; and
measured performance metrics that quantify the computing load the service is currently handling;
for at least one given measured performance metric, obtaining a per-capita load (PCL) by dividing the given measured performance metric by the number of VM instances being used to meet the computing load of the service;
accessing a user-defined per-capita target threshold (PCTT) representing an amount of the computing load each VM instance is to handle for the given performance metric;
determining a scaling action to be taken, but without flapping the VM instances by causing them to enter an undesirable cycle of alternately removing and then adding the same number of VM instances until the current computing load changes, by performing the following:
calculating a scaling factor based on dividing the PCL by the PCTT for the given performance metric, wherein the scaling factor represents an amount of variance between the at least one given measured performance metric and the user-defined per-capita target threshold (PCTT) representing an amount of the computing load each VM instance is to handle for the given performance metric;
calculating the number of VM instances required to scale to the scaling factor by determining a delta value based on the difference between i) the number of VM instances (n) currently being used to meet the computing load of the service and ii) n times the scaling factor; and
determining whether a scaling action is to occur based on the calculated delta value, and when a scaling action is determined, performing the following:
projecting the impact the scaling action will have on total capacity of the service to meet the current computing load; and
if the projected impact indicates that the scaling action will result in a new total capacity of the service that is unable to handle the current computing load, reducing the magnitude of the scaling action until the new total capacity will be able to serve the current computing load.

11. The computer-implemented method of claim 10, wherein the scaling action comprises adding virtual machines when the delta value is positive or removing virtual machines when the delta value is negative.

12. The computer-implemented method of claim 10, wherein the scaling action comprises increasing or decreasing the size of at least one virtual machine.

13. The computer-implemented method of claim 10, wherein at least one of the performance metrics is prioritized higher than at least one other performance metric.

14. The computer-implemented method of claim 13, wherein health of the virtual machines is prioritized over cost savings.

15. The computer-implemented method of claim 13, wherein the scaling factor is calculated for each of the measured performance metrics and wherein a specified scaling factor is selected based on the prioritization.

16. The computer-implemented method of claim 15, wherein the specified scaling factor comprises a maximum scaling factor that represents the highest amount of variance between the at least one given measured performance metric and the user-defined per-capita target threshold (PCTT).

17. The computer-implemented method of claim 10, further comprising:

determining that at least one performance metric, if implemented, would cause at least one service level agreement (SLA) to no longer be enforceable; and generating a notification that the selected operational metric would result in the SLA no longer being enforceable.

18. A computer system comprising memory containing computer-executable instructions, and one or more processors which, when executing the computer-executable instructions, cause the computer system to be configured with an architecture for auto-scaling cloud resources in order to increase or decrease the number of virtual machine (VM) instances used to meet a current computing load being handled by a service, and wherein the architecture comprises:

a communication module that periodically accesses information at given intervals, wherein the accessed information comprises:
  a determination of how many VM instances (n) are currently being used to meet a computing load of a service;
  measured performance metrics that quantify the computing load the service is currently handling; and
  a user-defined per-capita target threshold (PCTT) representing an amount of the computing load each VM instance is to handle for the given performance metric;

a calculation module that performs the following:
  for at least one given measured performance metric obtains a per-capita load (PCL) by dividing the given measured performance metric by the number of VM instances being used to meet the computing load of the service;
  determines a scaling action to be taken, but wherein the scaling action does not flap the VM instances by causing them to enter an undesirable cycle of alternately removing and then adding the same number of VM instances until the current computing load changes, by performing the following:
    calculating a scaling factor based on dividing the PCL by the PCTT for the given performance metric, wherein the scaling factor represents an amount of variance between the at least one given measured performance metric and the user-defined per-capita target threshold (PCTT) representing an amount of the computing load each VM instance is to handle for the given performance metric;
    calculating the number of VM instances required to scale to the scaling factor by determining a delta value based on the difference between i) the number of VM instances (n) currently being used to meet the computing load of the service and ii) n times the scaling factor; and
    determining whether a scaling action is to occur based on the calculated delta value.

19. The computing system of claim 18, further comprising a projected resource consumption module that performs the following when the scaling action is determined:
  projects the impact the scaling action will have on total capacity of the service to meet the current computing load; and
  if the projected impact indicates that the scaling action will result in a new total capacity of the service that is unable to handle the current computing load, reduces the magnitude of the scaling action until the new total capacity will be able to serve the current computing load.

20. A computer program product comprised of physical hardware storage media storing computer-executable instructions which, when executed by one or more processors, cause a computing system to perform a computer-implemented method for auto-scaling cloud resources in order to increase or decrease the number of virtual machine (VM) instances used to meet a current computing load being handled by a service, the computer-implemented method comprising:

periodically accessing information at given intervals, wherein the accessed information comprises:
  a determination of how many VM instances (n) are currently being used to meet a computing load of a service; and
  measured performance metrics that quantify the computing load the service is currently handling;

for at least one given measured performance metric, obtaining a per-capita load (PCL) by dividing the given measured performance metric by the number of VM instances being used to meet the computing load of the service;

accessing a user-defined per-capita target threshold (PCTT) representing an amount of the computing load each VM instance is to handle for the given performance metric; and determining a scaling action to be taken, but without flapping the VM instances by causing them to enter an undesirable cycle of alternately removing and then adding the same number of VM instances until the current computing load changes, by performing the following:
  calculating a scaling factor based on dividing the PCL by the PCTT for the given performance metric, wherein the scaling factor represents an amount of variance between the at least one given measured performance metric and the user-defined per-capita target threshold (PCTT) representing an amount of the computing load each VM instance is to handle for the given performance metric;
  calculating the number of VM instances required to scale to the scaling factor by determining a delta value based on the difference between i) the number of VM instances (n) currently being used to meet the computing load of the service and ii) n times the scaling factor; and
  determining whether a scaling action is to occur based on the calculated delta value, and when a scaling action is determined, performing the following:
    projecting the impact the scaling action will have on total capacity of the service to meet the current computing load; and
    if the projected impact indicates that the scaling action will result in a new total capacity of the service that is unable to handle the current computing load, reducing the magnitude of the scaling action until the new total capacity will be able to serve the current computing load.

* * * * *